United States Patent
Prickel et al.

(10) Patent No.: US 9,198,344 B2
(45) Date of Patent: Dec. 1, 2015

(54) SETUP WIZARD FOR AGRICULTURAL EQUIPMENT

(71) Applicant: CNH Canada, Ltd., Saskatoon (CA)

(72) Inventors: Marvin Prickel, Homer Glen, IL (US); John Stratton, Chicago, IL (US); Paul Weisberg, Saskatoon (SK)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 219 days.

(21) Appl. No.: 13/737,402

(22) Filed: Jan. 9, 2013

(65) Prior Publication Data

US 2014/0195126 A1 Jul. 10, 2014

(51) Int. Cl.
*A01B 79/00* (2006.01)
*A01B 71/02* (2006.01)

(52) U.S. Cl.
CPC ............. *A01B 79/005* (2013.01); *A01B 71/02* (2013.01)

(58) Field of Classification Search
CPC .............................. A01B 71/02; A01B 79/005
USPC ................. 701/50, 1, 36, 19.1, 29.1
See application file for complete search history.

(56) References Cited

U.S. PATENT DOCUMENTS

| | | | |
|---|---|---|---|
| 5,586,033 A | 12/1996 | Hall | |
| 6,282,476 B1 | 8/2001 | Hieronymus et al. | |
| 6,833,847 B1 | 12/2004 | Boegner et al. | |
| 6,928,358 B2 | 8/2005 | Brooks et al. | |
| 6,990,459 B2 | 1/2006 | Schneider | |
| 6,996,803 B2 | 2/2006 | Sakamoto et al. | |
| 7,225,060 B2 | 5/2007 | O'Connor et al. | |
| 7,356,773 B1 | 4/2008 | Barraclough | |
| 7,386,832 B2 | 6/2008 | Brunner et al. | |
| 7,506,309 B2 | 3/2009 | Schaefer | |
| 7,538,662 B2 | 5/2009 | Allmendinger | |
| 7,865,837 B1 | 1/2011 | Huff et al. | |
| 7,928,837 B2 | 4/2011 | Drew et al. | |
| 7,945,370 B2 | 5/2011 | Manan et al. | |
| 8,019,503 B2 | 9/2011 | Andreasen et al. | |
| 8,560,574 B2 * | 10/2013 | Austin et al. ................. | 707/793 |
| 2003/0208319 A1 | 11/2003 | Ell et al. | |
| 2003/0236671 A1 | 12/2003 | Andersen et al. | |
| 2004/0054821 A1 | 3/2004 | Warren et al. | |

(Continued)

OTHER PUBLICATIONS

Accommodating Both Expert Users and Novice Users in One Interface by Utilizing Multi-layer Interface in Complex Function Products; National Taipei University of Technology, Taiwan; T.K. Philip Hwang and Homg-Yi Yu—(7 Pages).

*Primary Examiner* — Helal A. Algahaim
*Assistant Examiner* — Nga X Nguyen
(74) *Attorney, Agent, or Firm* — Rebecca L. Henkel (57) ABSTRACT

A setup wizard is executable on a controller for a tractor and configured to interact with configuration modules of each implement operable with the tractor. The implements connected to the tractor may be auto detected or manually indicated by an operator. The setup wizard generates an initial series of questions intended to determine the intended use of the implements. The series of questions may be limited to one that requires one of two answers, such as yes/no. Based on the answers to the initial series of questions, the setup wizard may generate still additional questions or begin execution of each of the configuration modules as a function of these answers. The setup wizard may preload settings of an implement, select a portion of the setup screens that need to be reviewed, or provide a visual indication to the operator on the status of each configuration module.

9 Claims, 7 Drawing Sheets

(56) References Cited

U.S. PATENT DOCUMENTS

| | | | |
|---|---|---|---|
| 2006/0025894 A1* | 2/2006 | O'Connor et al. | 701/1 |
| 2008/0005177 A1 | 1/2008 | Steckel et al. | |
| 2008/0295090 A1 | 11/2008 | Bestle et al. | |
| 2009/0184812 A1 | 7/2009 | Drew et al. | |
| 2010/0180206 A1 | 7/2010 | Silva, Jr. et al. | |
| 2010/0217474 A1 | 8/2010 | Baumgarten et al. | |

* cited by examiner

SETUP WIZARD FOR AGRICULTURAL EQUIPMENT

BACKGROUND OF THE INVENTION

The subject matter disclosed herein relates generally to a controller for agricultural equipment and in particular, to a setup wizard for configuring various agricultural implements.

Modern farming practices have developed to improve the speed and efficiency of the farm equipment used to plant, maintain, and harvest crops. For example, tractors include a global positioning system (GPS) and a controller in the tractor is configured to provide a topographical view of a field and to identify the location of the tractor within the field based on the GPS coordinates. In addition, multiple agricultural implements may be connected to the tractor. During planting, for example, the tractor may pull an air cart having multiple containers including one or more types of seed and/or fertilizer. The tractor may also pull a planter behind the air cart which opens furrows in the ground, receives seeds from the air cart, plants the seed, applies fertilizer, and closes the furrow over the seed.

The controller on the tractor may be configured to control operation of the implements connected to the tractor. Different models of each implement may include varying operating parameters such as capacity, rate of application, or number of rows. The operating parameters may also depend, for example, on the speed of the tractor or the location within the field. Each of the operating parameters needs to be configured prior to operation of the respective implement. Consequently, each implement typically includes a configuration module stored on the controller of the tractor to configure operation of the respective implement.

However, as the number of features on the agricultural implements increase so does the number of operating parameters and the complexity of configuring operation of the tractor and the connected implements. In addition, different implements such as the air cart and planter may interact with each other. Changing the configuration of a parameter on one of the implements may impact operation of the other implement. Thus, it would be desirable to provide an improved method of configuring operation of the tractor and the connected implements.

SUMMARY OF THE INVENTION

The present invention provides a setup wizard executable on the controller for the tractor and configured to interact with the configuration modules of each implement operable with the tractor. Optionally, the controller may be located in other agricultural equipment, such as combines, sprayers, and the like. The setup wizard may auto detect the implements connected to the tractor via either the configuration modules stored in the controller or via wired or wireless electrical connections established with each of the implements. The setup wizard generates an initial series of questions intended to determine the intended use of the implements. For ease of setup, the series of questions may be limited to a binary answer, that is, a question that requires one of two answers (e.g., yes/no or true/false). Based on the answers to the initial series of questions, the setup wizard may generate still additional questions that require binary answers or that verify, for example, a portion of the configuration settings stored in the controller. Based on the answers to the initial and additional questions, the setup wizard executes each of the configuration modules as a function of these answers. For example, the setup wizard may preload a portion, or all, of the settings of an implement in its respective configuration module, select a portion of the setup screens that need to be reviewed as a function of the intended operation of the equipment, and provide a visual indication to the operator whether each configuration module has been completed.

According to one embodiment of the invention, a method of configuring a controller for a tractor is disclosed. The controller includes a processor, a memory device, a display, and a user interface. The controller is configured to execute a plurality of configuration modules, where each configuration module is associated with an agricultural implement operable with the tractor, and the memory device stores a configuration matrix defining operation of at least one of the agricultural implements. The method generates a first set of questions on the display corresponding to operation of the agricultural implements, where each of the first set of questions has a binary answer. Answers to each of the first set of questions are received from the user interface and each configuration module is executed with the processor as a function of the binary answers from the first set of questions to obtain configuration data of the corresponding agricultural implement, and the configuration data is stored in the configuration matrix. A second set of questions may be generated on the display corresponding to operation of the agricultural implements selected as a function of the binary answers to the first set of questions, where at least a portion of the second set of questions has a binary answer. The answer to each of the second set of questions is also received from the user interface, and each configuration module is executed also as a function of the answers to the second set of questions.

According to another aspect of the invention, each of the agricultural implements operatively connected to the tractor are automatically identified, and the first set of questions are generated as a function of the agricultural implements identified. At least a portion of the configuration matrix is preloaded from a data table stored in the memory device, where the data table corresponds to at least one of the agricultural implements identified.

According to yet another aspect of the invention, independent execution of each of the configuration modules is initially disabled and a prompt is presented on the display for the operator to answer the first set of questions. Upon configuring the controller, independent execution of each of the configuration modules is re-enabled.

According to still another aspect of the invention, at least a portion of configuration data from a first configuration module corresponds to configuration data from a second configuration module, and the corresponding configuration data is displayed by the second configuration module when it is executed. In addition, the order of execution of the configuration modules may be selected as a function of the binary answers from the first set of questions.

According to another embodiment of the invention, a method of obtaining data from an operator of a tractor for a configuration matrix defining operation of at least one agricultural implement operable with the tractor is disclosed. Each agricultural implement includes a configuration module having a plurality of input fields configured to solicit configuration data for the configuration matrix. The method generates a first set of questions to solicit the intended use of the agricultural implement, and each of the first set of questions is configured to receive a binary answer. Each of the binary answers to the first set of questions is received from the operator, and the plurality of input fields from each configuration module is displayed to the operator as a function of the binary answers from the first set of questions. Configuration data from the operator is received in each of the displayed input fields, and the configuration data from the operator is stored in the configuration matrix. Optionally, a subset of the input fields for the configuration module is displayed to the operator as a function of the answers to the first and second set of questions.

According to another aspect of the invention, a status indicator for each of the configuration modules is displayed, where the status indicator provides a visual indication to the operator whether the configuration module has been completed.

According to yet another embodiment of the invention, a system for configuring operation of at least one agricultural implement operable with a tractor includes a display configured to provide a set of questions to an operator, prompting the operator to enter configuration data corresponding to the agricultural implement, and a user interface configured to receive configuration data from the operator responsive to the set of questions. The system also includes a memory device configured to store a configuration matrix defining operation of the agricultural implements, a configuration module corresponding to each agricultural implement, and a setup wizard operable with each configuration module. A processor is configured to execute the setup wizard to generate the set of questions on the display corresponding to operation of the agricultural implements, where each of the questions has a binary answer, to receive the binary answers from the operator, to execute each configuration module as a function of the binary answers to obtain configuration data of the corresponding agricultural implement, and to store the configuration data in the configuration matrix.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

The drawings furnished herewith illustrate a preferred construction of the present invention in which the above advantages and features are clearly disclosed as well as others which will be readily understood from the following description of the illustrated embodiment.

DETAILED DESCRIPTION

The various features and advantageous details of the subject matter disclosed herein are explained more fully with reference to the non-limiting embodiments described in detail in the following description.

Figure 1:
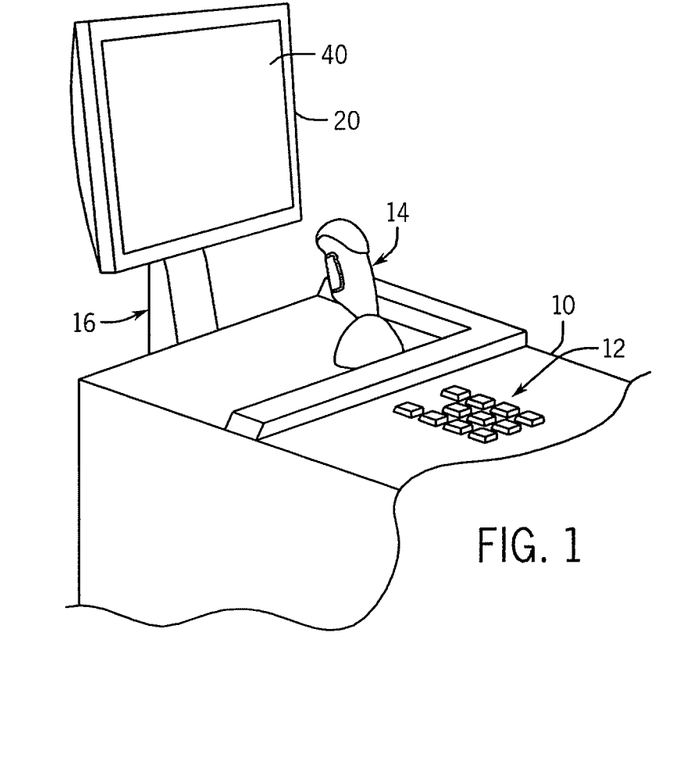
FIG. 1 is an exemplary environmental view of a tractor incorporating a controller according to one embodiment of the invention.

Referring to FIG. 1, the arm rest 10 of an exemplary tractor including a controller 20 incorporating the present invention is illustrated. The arm rest 10 includes various devices to receive input from the operator to control the tractor such as a panel of buttons 12 or a joystick 14. A mounting arm 16 is connected to the arm rest 10 and configured to hold the controller 20. Optionally, the controller 20 may be mounted to any suitable location within the tractor.

Figure 2:
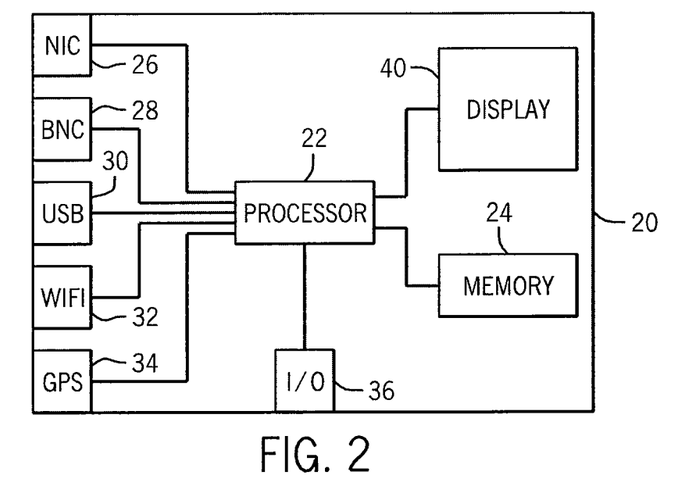
FIG. 2 is a block diagram representation of the controller of FIG. 1.

Referring next to FIG. 2, the controller 20 includes a processor 22 in communication with a memory device 24. It is contemplated that the processor 22 may be a single device or multiple devices operating in parallel or independently without deviating from the scope of the invention. Further, the processor 22 may a microprocessor, a field programmable gate array (FPGA), application specific integrated circuit (ASIC), discrete logic devices, or any combination thereof. It is further contemplated that the memory device 24 may be a single device or multiple devices, persistent or non-persistent memory, or any combination thereof. The controller 20 may include various combinations of ports with which the processor 22 is also in communication according to application requirements. As illustrated, the processor is in communication with a network interface card (NIC) 26, a Bayonet Neill-Concelman (BNC) connector 28 for coaxial cable, a Universal Serial Bus (USB) port 30, a wireless communication (WiFi) port 32, a global positioning system (GPS) antenna (34), and an input/output (I/O) port 36. The various ports provide interfaces between the processor 22 and local and/or remote resources including, but not limited to, the operator, attached agricultural implements, interface devices, radio and/or satellite communication devices. The processor 22 is further in communication with a display 40 to provide a visual indication of operating status and configuration to the operator. The display 40 may also be a touchscreen device configured to receive input from the operator.

Figure 3:
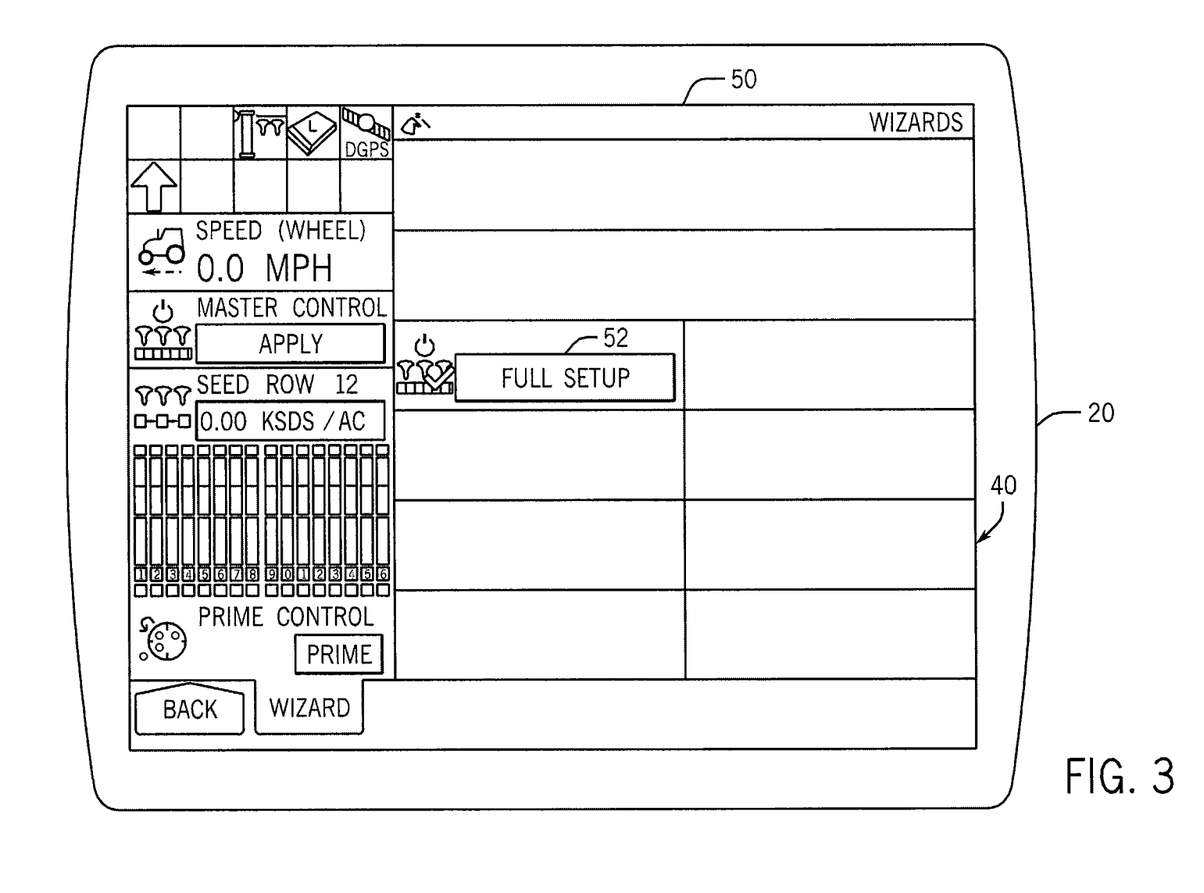
FIG. 3 is a front elevation view of the display of the controller of FIG. 1, illustrating an initial screen of a setup wizard according to one embodiment of the invention.
Figure 5:
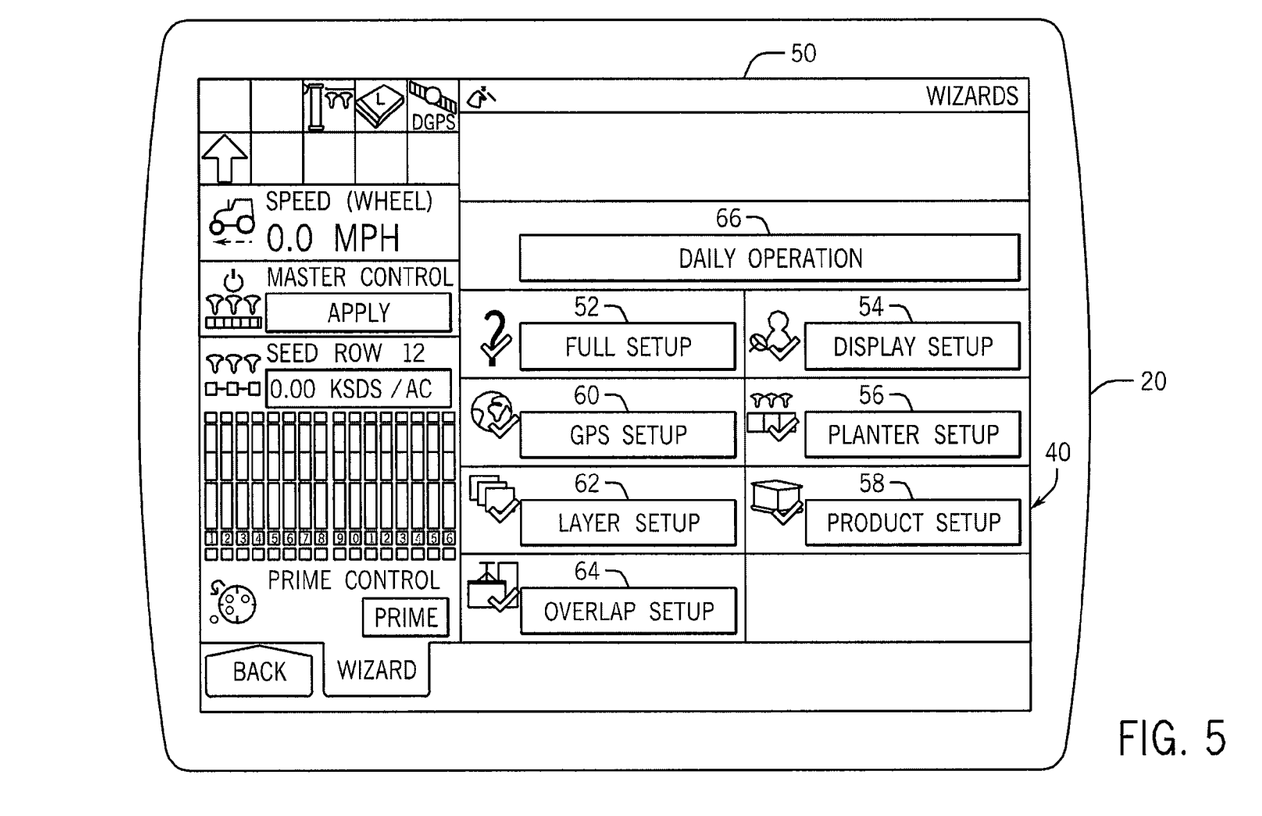
FIG. 5 is a front elevation view of the display of the controller of FIG. 1, illustrating a first list of each of the configuration modules executable on the controller upon completion of the setup wizard of FIG. 3.
Figure 6:
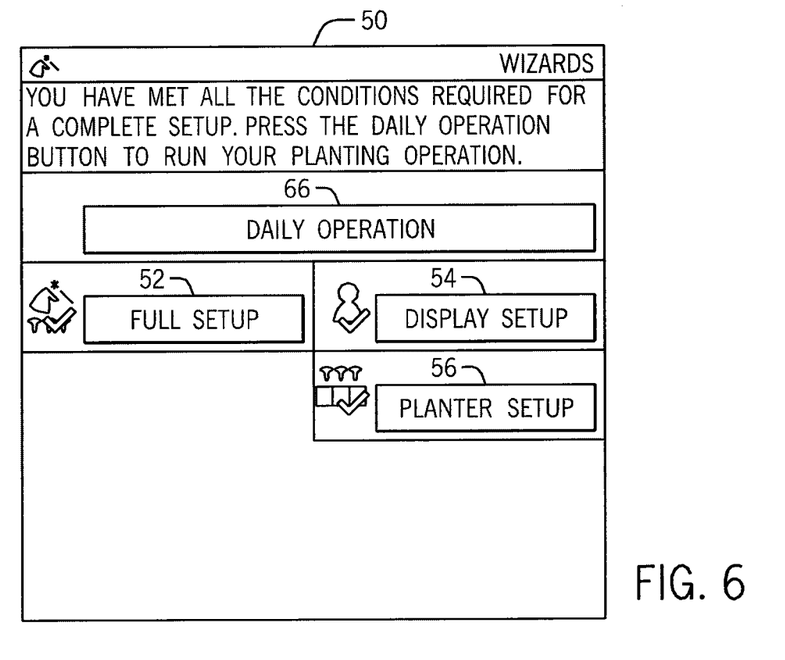
FIG. 6 is illustrates a second list of each of the configuration modules executable on the controller upon completion of the setup wizard of FIG. 3.

In operation, the controller 20 executes the setup wizard 50 to configure operation of the tractor and the agricultural implements operatively connected to the tractor. Referring next to FIG. 3, during initial execution, the setup wizard 50 disables each of the individual configuration modules and provides a single option to the operator, selecting the full setup button 52. By providing only this single option, the setup wizard 50 ensures that the operator follows the entire setup routine at least once. Once the operator has completed the entire setup routine at least once, the setup wizard makes other setup buttons (see e.g., FIGS. 5-6) available to the operator in addition to the full setup button 52.

Figure 4:
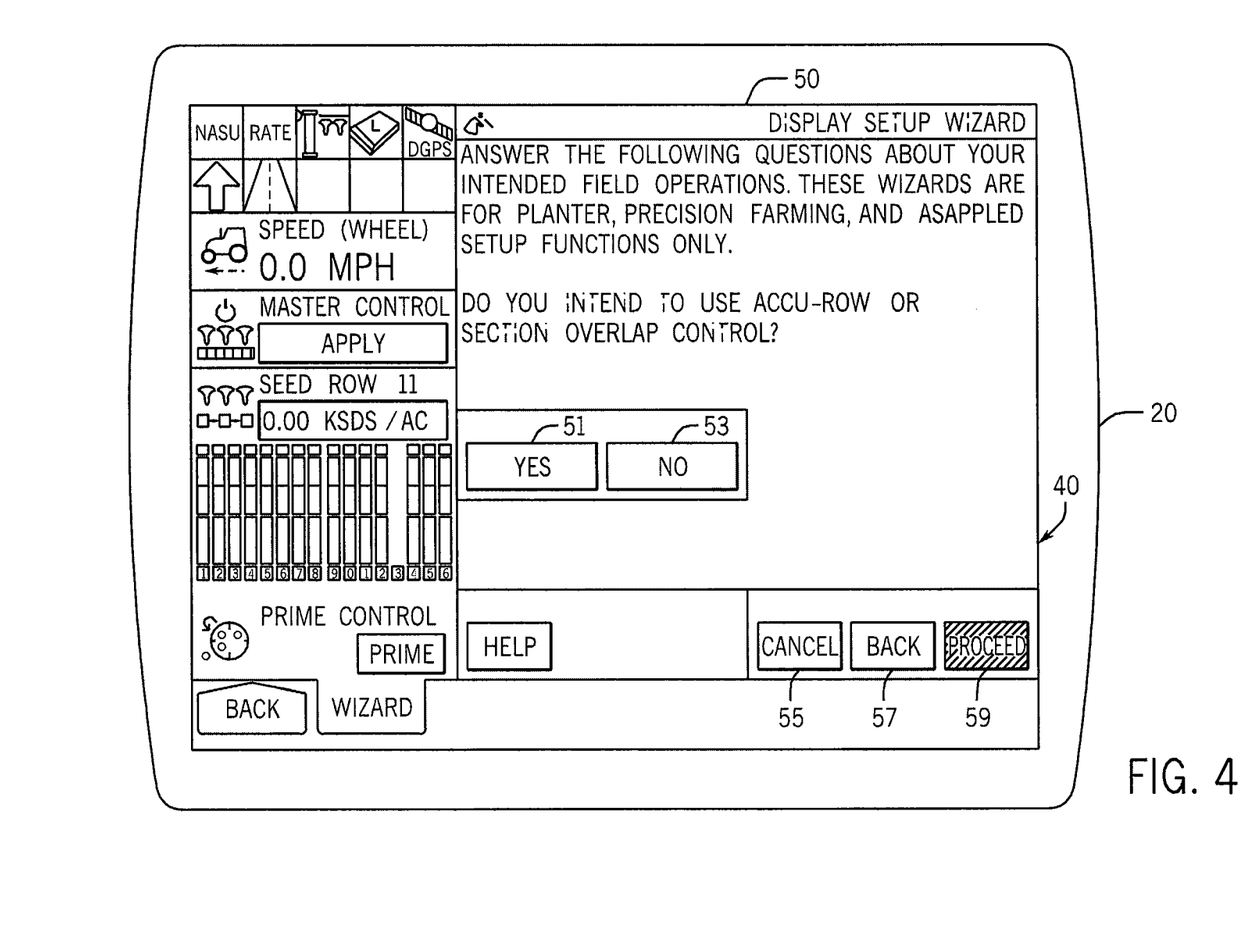
FIG. 4 is a front elevation view of the display of the controller of FIG. 1, illustrating an initial set of binary questions presented to an operator by the setup wizard of FIG. 3.
Figure 8:
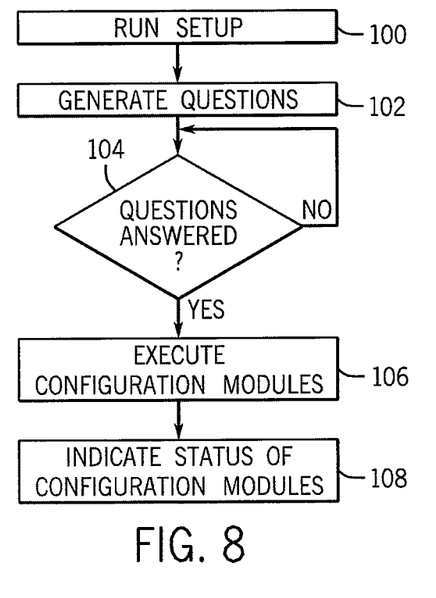
FIG. 8 is a flowchart illustrating the steps for execution of the setup wizard.

Referring next to FIG. 8, the setup wizard 50 begins execution when the operator selects the full setup button 52, as shown in step 100. At step 102, a list of questions is generated to determine the intended use and operation of the tractor and the attached agricultural implements. According to one embodiment of the invention, each of the questions is phrased such that a binary answer is required in response. A binary answer has one of two potential, and typically opposite, answers, including, but not limited to: "yes" or "no"; "true" or "false"; "on" or "off"; or "present" or "absent". The setup wizard 50 may generate display screens, as required, to prompt the operator for answers to each of the questions. Alternately, the setup wizard 50 may utilize existing screens from individual configuration modules, as shown in FIG. 4. An exemplary question is illustrated in FIG. 4, in which the setup wizard 50 asks whether the operator intends to use one of two features. A "Yes" button 51 and a "No" button 53 require the operator to answer the question with one of the two answers.

Navigation buttons may be used to ensure that the operator answers each question prior to moving on to the next question. For example, at the bottom of the window for the setup wizard 50, three navigation buttons are provided. A Cancel button 55, a Back button 57, and a Proceed button 59. As shown in FIG. 4, the Proceed button 59 is initially disabled. Upon receiving input from the operator selecting either the "Yes" button 51 or the "No" button 53, the setup wizard 50 enables the Proceed button 59, allowing the operator to move to the next question. Thus, the setup wizard 50 may be arrange the questions in a specific sequence if, for example, a later question is dependent on the answer of the earlier question. As shown in step 104, the setup wizard 50 presents all the initial questions prior to continuing setup of the controller 20.

Figure 11:
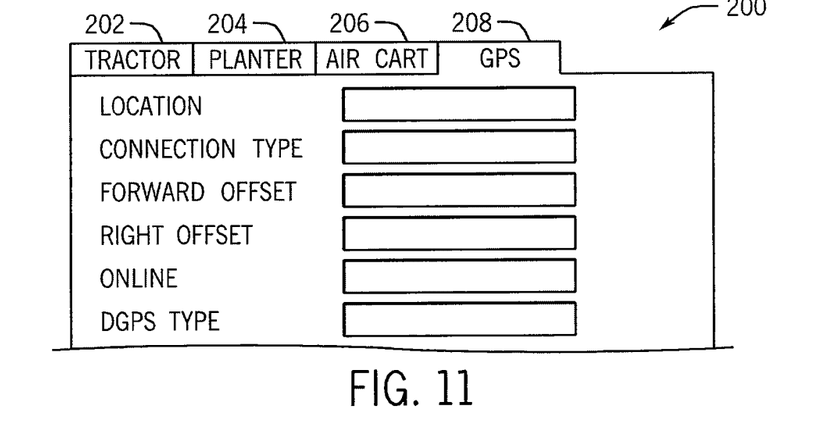
FIG. 11 is an exemplary screen displaying a portion of the contents of a configuration matrix corresponding to operation of the tractor and attached agricultural implements.

As the operator provides answers to each question, the answers are stored in the memory device 24. According to one embodiment of the invention, the controller 20 includes a configuration matrix which stores the configuration data that defines operation of the tractor and the agricultural implements. It is contemplated that the configuration matrix may be stored in any structured manner, including, but not limited to, a spreadsheet, a database, software libraries such as a dynamic link library (DLL), or a combination thereof. Referring next to FIG. 11, an exemplary display 200 of a portion of the contents of the configuration matrix is illustrated. The display 200 includes a series of tabs 202-208, allowing selection of the tractor tab 202, one of the agricultural implement tabs 204, 206, or a feature tab 208, such as the GPS, installed on the tractor. Various configuration or operational properties of the selected device or feature are stored in the configuration matrix and may be displayed in any suitable manner.

Figure 7:
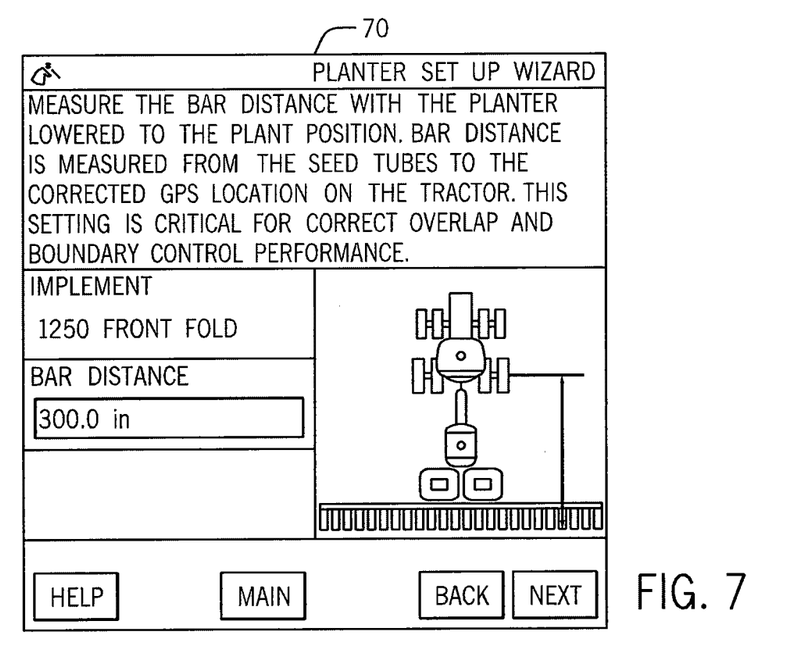
FIG. 7 is illustrates an exemplary screen from one of the configuration modules.
Figure 10:
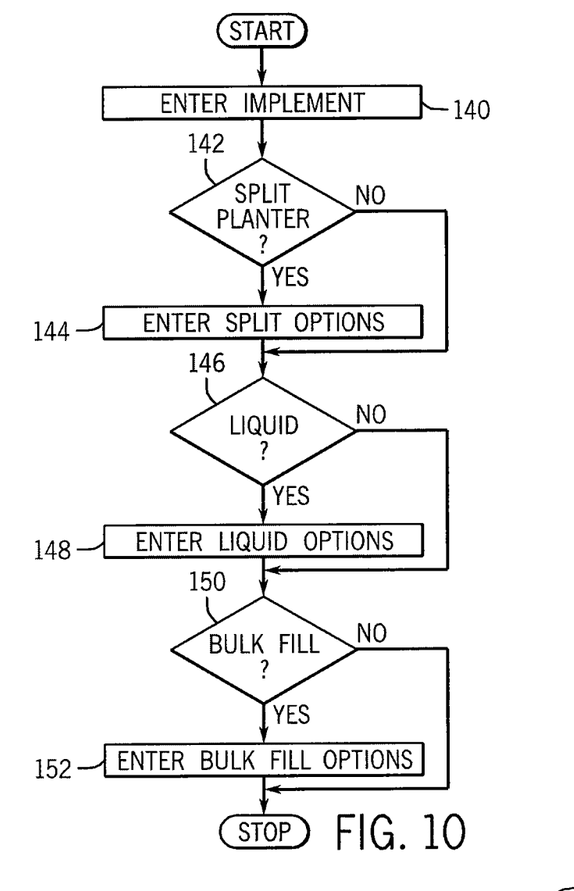
FIG. 10 is a flowchart illustrating the steps for executing a configuration module upon completion of the setup wizard.

Referring again to FIG. 8, at step 106, the setup wizard 50 next executes each of the configuration modules 70 as a function of the answers received to the initial set of questions. Exemplary operation of the Planter Setup Wizard as a function of the answers received to the initial set of questions is illustrated in FIG. 10. At step 140, the specific agricultural implement and/or model of agricultural implement being configured is entered. The data field may be preset according to an initial automatic identification routine determining which agricultural implements are attached. For example, an exemplary setup window, illustrated in FIG. 7, shows a Bar Distance data field preloaded with a default value according to the type of Implement, namely a 1250 Front Fold. At step 142, the setup wizard 50 then reads the answer to the question whether the operator intends to use the split row feature of the planter. If the answer is "yes", the setup wizard 50, at step 144, displays the screen(s) from the planter configuration module that are required to configure the split row feature. If the answer is "no", the setup wizard 50 proceeds to the next feature for which the initial set of questions obtained an answer. As illustrated in FIG. 10, the process is repeated for answers to questions such as whether the operator intends to use a liquid fertilizer (steps 146, 148) and whether the operator intends to use the bulk fill options (steps 150, 152). The steps illustrated in FIG. 10 are exemplary and it is contemplated that some may be removed or others added according to various models and/or features on different agricultural implements. Further, the steps may be executed in varying order without deviating from the scope of the invention.

Referring again to FIG. 8, at step 108 the setup wizard 50 reviews the configuration matrix to determine whether each of the configuration modules has been properly completed. In addition, the setup wizard 50 enables independent execution of individual configuration modules, displaying setup buttons for each feature and/or implement identified as intended to be used based on the answers to the initial set of questions. For example, different combinations of the Display Setup button 54, Planter Setup button 56, Product Setup button 58, GPS Setup button 60, Layer Setup button 62, and Overlap Setup button 64 are displayed in FIGS. 5 and 6 as a result of the intended use of the tractor and implements identified by the operator. A visual indicator, such as a green check mark, is also provided next to the setup button for each configuration model that was properly completed. However, there may be instances in which data was entered incorrectly and are, for example, outside an acceptable range of operating parameters. Similarly, data from one configuration module may interact with data from another configuration module such that the two settings cannot be simultaneously realized. The setup wizard 50 is configured to check for setup errors and generate messages if an error exists. Further, the setup wizard 50 will present a visual indicator, such as a red "X" next to the setup button for each configuration module that is not properly completed.

Figure 9:
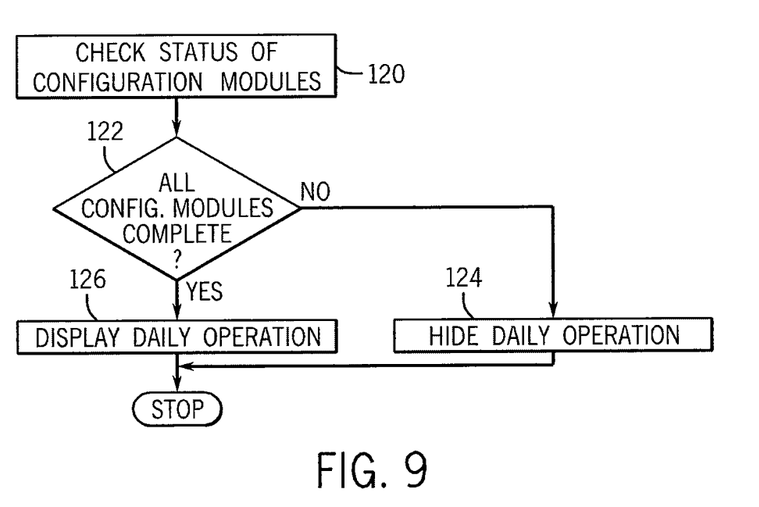
FIG. 9 is a flowchart illustrating the steps for displaying configuration modules upon completion of the setup wizard.

Referring next to FIG. 9, the setup wizard 50 verifies that all configuration modules have been properly completed prior to presenting the daily operation button 66 on the display 40. At step 120, the setup wizard 50 checks the status of each configuration module 70. At step 122, the setup wizard 50 verifies that each configuration module has been completed properly. If each configuration module has been completed properly, the Daily Operation button 66 is presented to the operator on the display 40. If each configuration module has not been completed properly, the Daily Operation button 66 is either disabled or hidden from the operator such that it may not be selected from the display 40. Thus, the setup wizard 50 verifies that no configuration errors exist prior to beginning operation of the tractor in a field. The Daily Operation button 66 is used for illustration and is not meant to be limiting. The setup wizard 50 may similarly require each configuration module, or a portion of the configuration modules, to be completed properly prior to enabling other operation of the tractor and/or attached agricultural implements according to the requirements of the corresponding operation.

As described above, the setup wizard 50 ensures that each of the configuration modules is properly completed prior to allowing the operator to begin operation of the tractor. According to one embodiment of the invention, the setup wizard 50 ensures that each of the configuration modules is properly completed even if power is cycled during the initial configuration. The setup wizard 50 stores answers to each of the initial questions in the memory device 24. Consequently, if power is cycled during the initial configuration, on power up the setup wizard 50 may first read the data from the memory device 24 to identify whether all of the initial questions were answered and whether each of the configuration modules was properly completed. If not, the setup wizard 50 identifies which question it last presented prior to power being cycled and restarts the configuration process at that question. Optionally, an index of questions and/or configuration modules is maintained and the setup wizard 50 may read the index to identify whether initial setup was complete or to identify the correct starting location within the initial configuration.

It is further contemplated that the setup wizard 50 may provide a multiple tier set of, or multiple sets of initial questions. A first tier or first set of initial questions is developed that must be answered and that requires binary answers. A second tier or second set of initial questions is developed that may either depend on an answer from the first tier or may require an answer other than a binary answer. For example, the first set of initial questions may prompt the operator for answers to questions such as: whether the operator intends to use GPS. The answer to the first tier question is subsequently used to present the second tier or second set of questions. For example, if the operator intends to use GPS, subsequent questions regarding whether the operator intends to used functions that rely on GPS are presented. If the operator does not intend to use GPS, subsequent questions regarding functions that rely on GPS are not presented and the answers to the questions are automatically set to "no" in the configuration matrix. Upon completion of both tiers or sets of questions, the setup wizard 50 executes the individual configuration modules according to the answers from each tier, or set, of questions. Thus, the setup wizard 50 may simplify and speed up the initial configuration by eliminating questions that are not required based on the answer to an earlier presented question.

The setup wizard 50 may also implement automatic configuration of at least a portion of the configuration matrix. Upon initial execution, the setup wizard 50 may automatically detect the agricultural implements operatively connected to the tractor either via a wired or wireless connection. Optionally, setup wizard 50 may detect the configuration modules loaded into the controller 20 to identify the agricultural implements that are connected. As still another option, an initial configuration screen may be presented to identify the agricultural implements connected to the tractor. The setup wizard 50 then generates the initial set of questions as a function of the agricultural implements that were detected. Further, the setup wizard 50 may read default settings, for example, from a spreadsheet, database, or DLL stored in the memory device 24 and preload a portion of the configuration matrix according to the default settings.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of configuring a controller for a tractor; the controller including a processor, a memory device, a display, and a user interface, wherein the controller is configured to execute a plurality of configuration modules, each configuration module is associated with an agricultural implement operable with the tractor, and the memory device stores a configuration matrix defining operation of at least one of the agricultural implements; the method comprising the steps of:
   Automatically identifying each of the agricultural implements operatively connected to the tractor;
   Generating a first set of questions on the display corresponding to operation of the agricultural implements identified, wherein each of the first set of questions has a binary answer;
   Receiving from the user interface the binary answer to each of the first set of questions, the binary answers defining configuration data for the agricultural implements;
   Storing the configuration data in a configuration matrix;
   Executing each configuration module with the processor as a function of the binary answer from the first set of questions, and each configuration module generating a second set of questions on the display corresponding to the agricultural implements selected as a function of the binary answers to the first set of questions, at least a portion of the second set of questions having binary answer;
   Receiving from the user interface an answer to each of the second set of questions;
   Verifying that each configuration module was completed properly prior to enabling operation of the tractor.

2. The method of configuring the controller provided in the tractor of claim 1 further comprising the step of preloading at least a portion of the configuration matrix from a data table stored in the memory device, the data table corresponding to at least one of the agricultural implements identified.

3. The method of configuring the controller provided in the tractor of claim 1 further comprising the initial steps of:
   disabling independent execution of each of the configuration modules; and
   displaying a prompt on the display to answer the first set of questions.

4. The method of configuring the controller provided in the tractor of claim 3 further comprising the final step of enabling independent execution of each of the configuration modules.

5. The method of configuring the controller provided in the tractor of claim 1 wherein at least a portion of configuration data from a first configuration module corresponds to configuration data from a second configuration module and wherein the corresponding configuration data is displayed by the second configuration module when it is executed.

6. The method of configuring the controller provided in the tractor of claim 1 wherein an order of execution of the configuration modules is selected as a function of the binary answers from the first set of questions.

7. A system for configuring operation of at least one agricultural implement operable with a tractor, the system comprising:
   A display configured to provide a set of questions to an operator prompting the operator to enter configuration data corresponding to the agricultural implement;
   A user interface configured to receive configuration data from the operator responsive to the set of questions;
   A memory device configured to store:
      A configuration matrix defining operation of the agricultural implements, A configuration module corresponding to each agricultural implement, and A setup wizard operable with each configuration module;

A processor configured to execute the setup wizard to:

Automatically identify the at least one agricultural implement operable with the tractor, Generate the set of questions on the display corresponding to operation of the agricultural implements identified, wherein each of the questions has a binary answer, Receive the binary answers from the operator, the binary answers defining configuration data for the agricultural implements, Store the configuration data in the configuration matrix, Execute each configuration module as a function of the binary answers, each configuration module generating a second set of questions on the display corresponding to the agricultural implements selected as a function of the binary answers to the first set of questions, Receive answers to each of the second set of questions, and Verifying that each configuration module was completed properly prior to enabling operation of the tractor.

8. The system of claim 7 wherein the processor is further configured to execute the setup wizard to:

preload at least a portion of the configuration matrix from a data table stored in the memory device, the data table corresponding to at least one of the agricultural implements identified.

9. The system of claim 7 wherein at least a portion of configuration data from a first configuration module corresponds to configuration data from a second configuration module and wherein the corresponding configuration data is displayed by the second configuration module when it is executed.

* * * * *